United States Patent
Paramasivam Balakrishnan et al.

(10) Patent No.: US 11,288,140 B2
(45) Date of Patent: Mar. 29, 2022

(54) POINT IN TIME BLOB RESTORE

(71) Applicant: Microsoft Technology Licensing, LLC, Redmond, WA (US)

(72) Inventors: Venkates Paramasivam Balakrishnan, Redmond, WA (US); Krishnan Varadarajan, Redmond, WA (US); Maneesh Sah, Sammamish, WA (US); Sundar P. Subramani, Bellevue, WA (US); Bitan Deb, Redmond, WA (US); Bharat Joshi, Kirkland, WA (US); Malavika Arunmozhi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 16/683,796

(22) Filed: Nov. 14, 2019

(65) Prior Publication Data
US 2021/0064483 A1  Mar. 4, 2021

Related U.S. Application Data

(60) Provisional application No. 62/893,663, filed on Aug. 29, 2019.

(51) Int. Cl.
*G06F 11/00* (2006.01)
*G06F 11/14* (2006.01)

(52) U.S. Cl.
CPC ...... *G06F 11/1469* (2013.01); *G06F 11/1471* (2013.01); *G06F 11/1451* (2013.01); *G06F 2201/84* (2013.01)

(58) Field of Classification Search
CPC ............ G06F 11/1446; G06F 11/1448; G06F 11/1451; G06F 11/1458; G06F 11/1464; G06F 11/1469; G06F 11/1471
See application file for complete search history.

(56) References Cited

U.S. PATENT DOCUMENTS

| | | | |
|---|---|---|---|
| 9,971,821 B1 | 5/2018 | Gupta et al. | |
| 10,657,004 B1 * | 5/2020 | Dalmia | G06F 16/128 |

(Continued)

OTHER PUBLICATIONS

"Backup and Restore for External Blobstores", Retrieved from: https://web.archive.org/web/20180824230529/https:/docs.cloudfoundry.org/bbr/external-blobstores.html, Aug. 24, 2018, 8 Pages.

(Continued)

*Primary Examiner* — Marc Duncan
(74) *Attorney, Agent, or Firm* — Rainier Patents, P.S.

(57) ABSTRACT

Described herein is a system method for point in time blob restore. In response to receipt of a request to restore a particular blob range to a particular point in time, read and/or write operations on the particular blob range requested to be restored are blocked. Blob(s) in the particular blob range which have changed since the particular point in time are determined based, at least in part, upon information stored in a change log and/or a deleted blob store. A determination is made as to whether the requested restore operation can be performed, for example, based upon a restoration policy. When it is determined that the requested restore operation can be performed, blob(s) determined to have changed since the particular point in time based, at least in part, upon information stored in the change log and/or the deleted blob store are restored.

20 Claims, 5 Drawing Sheets

(56) References Cited

U.S. PATENT DOCUMENTS

| | | | |
|---|---|---|---|
| 10,740,192 B2* | 8/2020 | Bono | G06F 16/113 |
| 10,956,279 B2* | 3/2021 | Abadi | G06F 11/1456 |
| 2003/0204516 A1 | 10/2003 | Klosterhalfen et al. | |
| 2006/0155943 A1* | 7/2006 | Todd | G06F 16/162 |
| | | | 711/161 |
| 2010/0312754 A1* | 12/2010 | Bear | G06F 16/134 |
| | | | 707/685 |
| 2011/0099347 A1 | 4/2011 | Plasek et al. | |
| 2017/0199818 A1 | 7/2017 | Lomet et al. | |
| 2017/0235745 A1 | 8/2017 | Hoobler et al. | |
| 2019/0005262 A1 | 1/2019 | Surla et al. | |
| 2019/0196916 A1 | 6/2019 | Kumarasamy et al. | |
| 2020/0409570 A1* | 12/2020 | Wolfson | G06F 11/1469 |
| 2020/0409802 A1* | 12/2020 | Lim | G06F 11/1464 |
| 2021/0209060 A1* | 7/2021 | Kottomtharayil | G06F 11/1448 |

OTHER PUBLICATIONS

"Creating a Snapshot of a Blob", Retrieved from: https://docs.microsoft.com/en-us/rest/api/storageservices/creating-a-snapshot-of-a-blob, May 15, 2019, 3 Pages.

"Recovery features comparison: ApexSQL Log vs. ApexSQL Recover", Retrieved from: https://web.archive.org/web/20150718144927/https:/knowledgebase.apexsql.com/recovery-features-comparison-apexsqllog-vs-apexsqlrecover/, Jul. 18, 2015, 8 Pages.

Doddameti, et al., "Object Storage Change-Events", Application as Filed in U.S. Appl. No. 16/507,208, filed Jul. 10, 2019, 34 Pages.

Gaurav, "Oops! I Deleted My Blobs! What Can I Do?", Retrieved from: https://gauravmantri.com/2018/02/23/oops-deleted-blobs-can/, Feb. 23, 2018, 17 Pages.

Koranga, Heera Singh, "Extract blobs from redologs using zmredodump", Retrieved from: https://wiki zimbra.com/wiki/Steps_to_extract_blobs_from_redologs_using_zmredodump, Sep. 12, 2017, 5 Pages.

Nayak, et al., "Soft delete for Azure Storage blobs", Retrieved from: https://docs.microsoft.com/en-us/azure/storage/blobs/storage-blob-soft-delete, Apr. 23, 2019, 21 Pages.

U.S. Appl. No. 15/991,039, filed May 29, 2018, 26 pages.

"Storage Accounts—Restore Blob Ranges", Retrieved from: https://docs.microsoft.com/en-us/rest/api/storagerp/storageaccounts/restoreblobranges, Jun. 1, 2019, 6 Pages.

Mantri, Gaurav, "Oops! I Deleted My Blobs! What Can I Do?", Retrieved from: https://gauravmantri.com/2018/02/23/oops-deleted-blobs-can/, Feb. 23, 2018, 13 Pages.

"International Search Report and Written Opinion Issued in PCT Application No. PCT/US20/037122", dated Nov. 5, 2020, 14 Pages.

* cited by examiner

POINT IN TIME BLOB RESTORE

RELATED APPLICATION

This application claims priority to U.S. Provisional Application No. 62/893,663, filed Aug. 29, 2019, entitled "Point in Time Blob Restore", the disclosure of which is hereby incorporated by reference herein in its entirety.

BACKGROUND

Cloud storage enables data to be stored on the Internet at a remote site rather than, or in addition to, storing data on-premises. Cloud storage typically refers to an object storage service or system. In some cases, cloud storage may offer a massively scalable object storage system for data objects, a file system service for the cloud, a messaging store for reliable messaging, and the like. Redundancy within cloud storage may ensure that data is safe in the event of transient hardware failures. Further, data may be replicated across datacenters or geographical regions of the cloud storage for additional protection.

For providers, cloud storage may include a multi-tenant environment which stores many objects (e.g., hundreds, thousands, millions, etc.) within the object storage system. For example, objects may be used to store files, images, documents, and the like, in an unstructured format. Objects may be updated by users, software, and systems, with authorized access to such objects. In this environment, it may be beneficial for a client to understand what and how their data is being accessed. However, when changes are made to an object, the only indicator is typically in the form of a timestamp which identifies a point in time at which the object was most recently modified or added. The timestamp does not provide any context about the object. Furthermore, for the user to view the timestamp information the user often has to access a storage file/container and view objects on a line-byline basis to locate an identifier of the desired object.

SUMMARY

Described herein is a system for point in time blob restore, comprising: a computer comprising a processor and a memory having computer-executable instructions stored thereupon which, when executed by the processor, cause the computer to: receive a request to restore a particular blob range to a particular point in time; block read and write operations on the particular blob range requested to be restored; determine which blobs in the particular blob range have changed since the particular point in time based, at least in part, upon information stored in at least one of a change log or a deleted blob store; determine whether the requested restore operation can be performed; when it is determined that the requested restore operation can be performed, restore at least one blob determined to have changed since the particular point in time based, at least in part, upon information stored in at least one of the change log or the deleted blob store.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to point in time blob restore are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding object storage restore using change log data. What follows are one or more exemplary systems and methods.

Aspects of the subject disclosure pertain to the technical problem of point in time blob restore. The technical features associated with addressing this problem involve receiving a request to restore a particular blob range to a particular point in time; blocking read and write operations on the particular blob range requested to be restored; determining which blobs in the particular blob range have changed since the particular point in time based, at least in part, upon information stored in at least one of a change log or a deleted blob store; determining whether the requested restore operation can be performed; when it is determined that the requested restore operation can be performed, restore at least one blob determined to have changed since the particular point in time based, at least in part, upon information stored in at least one of the change log or the deleted blob store. Accordingly, aspects of these technical features exhibit technical effects of more efficiently and effectively storing data, for example, reducing consumption of computing resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Blobs enable retention of large amounts of unstructured data and typically include the data itself, metadata of the data, one or more identifiers of the blob, and the like. Blob storage customer(s) can desire to return one or more blob(s) to a previous point in time for various reasons. For example, blob(s) can be accidentally deleted and/or inadvertently modified due to software bug(s) from a latest deployment, a disgruntled employee, and the like.

Described herein is a system and method of point in time blob restore in which blob(s) can be restored to a previous point in time. For example, change(s) can be undone until a point in time that a user deems to be good (e.g., the time before the most recent deployment). The system and method can leverage data protections feature(s) including soft delete and/or lifecycle management to restore the data and/or metadata associated with the blob(s) at that particular point in time. In some embodiments, the point in time blob restore is a fully managed feature that performs the necessary undo operation on behalf of the user to restore the entire storage account and/or parts of the storage account.

Figure 1:
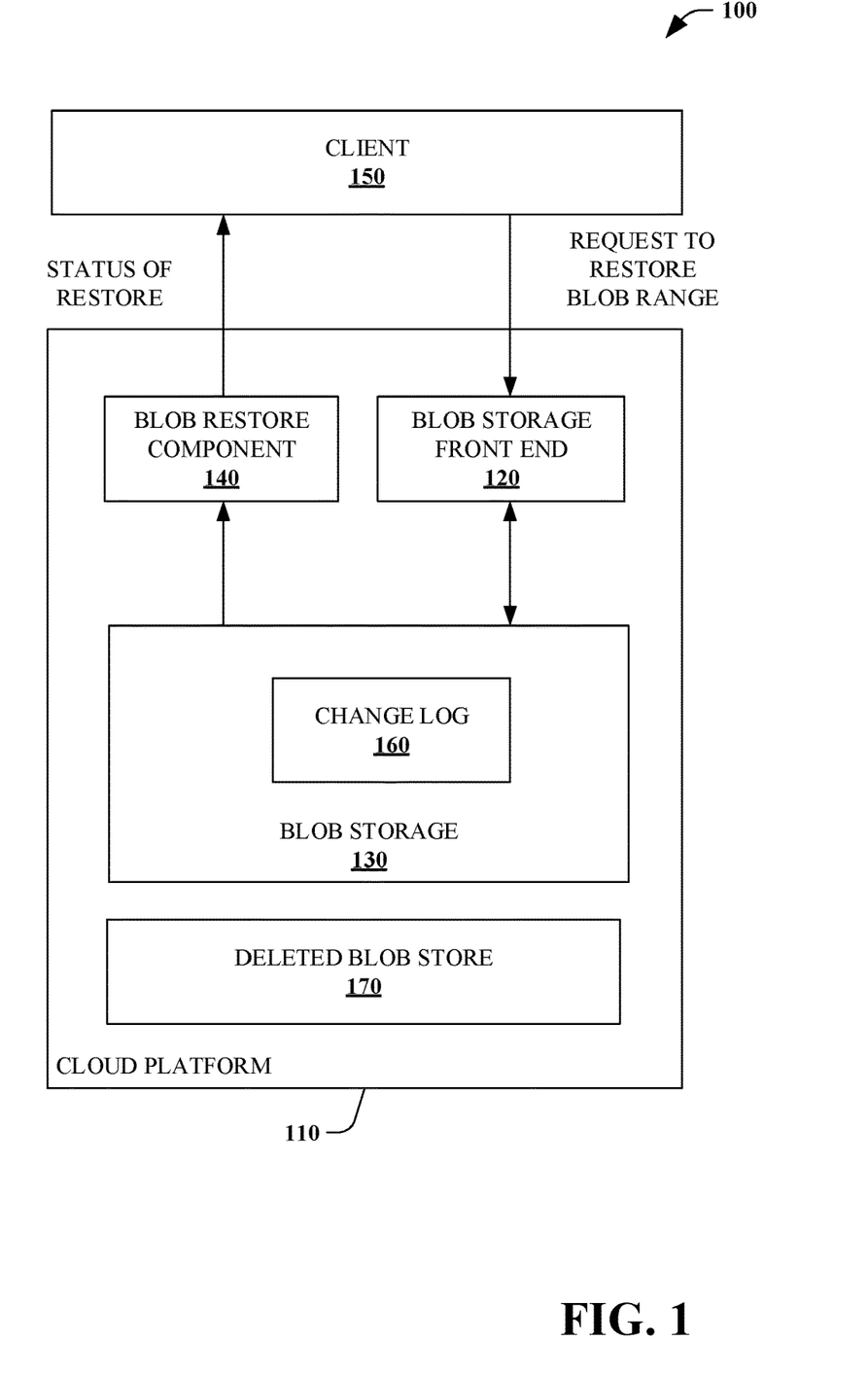
FIG. 1 is a functional block diagram that illustrates a system for point in time blob restore.

Referring to FIG. 1, a system for point in time blob restore 100 is illustrated. The system 100 includes a cloud platform 110 which may implement the blob storage system.

In some embodiments, the cloud platform 110 can include create/update management policies operation that sets management policies for a storage account like lifecycle management policy for blobs. This can be used to enable point in time restore support for blobs in the account. In some embodiments, the dependent features (e.g., soft-delete, stable versioning, change log/feed) must be enabled before and/or along with enabling point in time restore.

The cloud platform 110 includes a blob storage front end 120, a blob storage 130 (also referred to as a partition layer) which can include partition(s) of storage for storing blobs, files, tables, and the like, and a blob restore component 140. A client 150 may modify data stored within the storage 130. For example, the client 150 may add a new blob, modify/change an existing blob, delete a blob, and the like, via a request that is sent to the blob storage front-end 120. In response, the blob storage front-end 120 may trigger a requested change to a blob stored within the storage 130.

Change(s) to, deletion(s), and/or addition(s) within the storage 130 may be recorded within a change log 160 which may also be stored within the partition layer. Changes may be stored as events which identify a location of the blob within the partition layer of the storage 130, an account associated with the blob being changed, a timestamp of the change, metadata of the change, context of the change, and/or the like.

The change log 160 can include contextual attribute(s) of the change to the object from an updated state of the log file that stores information about the unstructured storage object. The contextual attributes may identify a type of change, an account or user associated with the change, an updated storage location of the object within a partition of the storage, a chronological order of the change with respect to other changes, and the like. For example, the change log 160 may include an append-only log file that stores a chronological order of changes to blobs within a multi-tenant blob storage which are detected from the blob storage. The change log 160 may include an identification of a location of the blob storage within a partition layer, an account associated with the blob, an event type of the change, a timestamp of the change, metadata further describing the change, and the like.

In some embodiments, the system 100 further includes a deleted blob store 170 that stores recently deleted blob(s). In some embodiments, the recently deleted blob(s) are stored in the deleted blob store 170 via a delete blob function (not shown) of the cloud platform 110 accessible via an application programming interface (API) (e.g., soft delete blob). In some embodiments, undelete is performed on a per blob basis.

In some embodiments, a length of time for recently deleted blob(s) to be retained and subject to undeletion is based upon a customer-specified policy (e.g., retain for one day, one month, one year). In some embodiments, an amount of storage allocated for recently deleted blob(s) to be retained and subject to undeletion is based upon a customer-specified policy with blob(s) permanently removed on a first-in-first-out basis once the amount of storage allocated has been reached or exceeded.

The blob restore component 140 receives a request to restore a particular blob range to a particular point in time, for example, from a user for a particular blob storage account. In some embodiments, the blob restore component 140 receives requests via an application programming interface (API).

In some embodiments, the blob restore component 140 checks that the soft-delete policy is enabled (e.g., from get blob service properties) and that the retention period set is greater than or equal to the value of the particular point in time to the current time. In some embodiments, the system 100 disallows setting of these properties when a restore operation is in progress.

In some embodiments, the blob restore component 140 can be used to restore a few blob ranges in a storage account and/or the entire account. In some embodiments, the user request must have write permissions on the entire account. In some embodiments, a restore identifier that uniquely identifies the restore operation can be returned in response to the request.

In response to the request, the blob restore component 140 blocks read and/or write operations. In some embodiments, read and/or write operations are blocked on the entire blob storage associated with the particular blob storage account. In some embodiments, read and/or write operations are block on the particular blob range requested to be restored.

Next, the blob restore component 140 determines which blob(s) in the particular blob range, if any, have changed since the particular point in time based, at least in part, upon information stored the change log 160 and/or the deleted blob store 170. The blob restore component 140 then determines whether the requested restore operation can be performed. In some embodiments, a restore operation cannot be performed for unsupported operation(s) (e.g., for a set metadata operation that was performed between the time to restore and the current time). In some embodiments, a restore operation cannot be performed for blobs subject to predefine particular restriction(s) (e.g., a blob has an active lease). In some embodiments, if a blob cannot be restored, then the restore operation is failed and live traffic resumed.

When it is determined that the requested restore operation can be performed, the blob restore component 140 restores blob(s) determined to have changed since the particular point in time based, at least in part, upon information stored the change log 160 and/or the deleted blob store 170. In some embodiments, one or more policy(ies) may prevent (e.g., temporarily) blob restoration. For example, a policy can prevent restoration of a blob in which a user has an active lease providing exclusive access to the blob.

In some embodiments, a restore table (e.g., based on the restore identifier) can be created, for example, in the user account. The restore table can be deleted after the restore operation completes. In some embodiments, the change log 160 captures all the changes to blob(s) and corresponding mutations.

For purposes of explanation and not limitation, exemplary behavior of the restore blob functionality can be described as follows. In some embodiments, the change log 160 does not capture event(s) related to changes to containers. Therefore, the system 100 does not support restoring changes made through container APIs. In some embodiments, this can include the case of Delete Container API which hard-deletes all the blobs in that container.

In some embodiments, the restore operation is performed through an asynchronous workflow. The request to restore arrives at the cloud platform 110 (e.g., shared resource provider (SRP)). When the call passes API validations, the request can be persisted as a pending transaction and an accepted status code can be sent back. In some embodiments, any subsequent call(s) to the cloud platform 110 (e.g., SRP) for those blob ranges will be blocked because of the pending transaction. The pending transaction can be sent to the restore component 140.

The restore component 140 orchestrates the workflow by blocking live traffic and isolating the blob and the container partitions for the account. A request can be placed on a queue, which is polled for new request(s) to restore.

The restore component 140 can create a Restore Table in the account specified in the request where the restore component 140 can update the restore status for each of the blobs being restored. Thereafter the restore component 140 can enumerate the blobs that have changed in the account and populate the Restore Table. To restore, for each row in the Restore Table, the restore component 140 can call the APIs with a shared access signature (SAS) key included in the restore request.

For purposes of explanation and not limitation, the following restore scenario is provided. Account state at different points in time is set forth along with a corresponding explanation of what occurs during restore by the system 100.

Consider Blob1V1, Blob1V2 which represents different versions of a blob where Blob1V1' and Blob1V1" represent metadata changes done to the blob and Blob2V2-sd T1, T2 etc. represent the state of root blobs of the account at that time. For purposes of explanation and not limitation, the blobs are in the same container and represent the state of root blobs of the account at that time.

The following operations are performed between T1 through T4. An initial state is set forth in Table 1:

TABLE 1

Initial state at time T1:
Blob1V1
Blob2V1
Blob3V1

Thereafter, the following operation is executed: UpdateMetadata(Blob1), PutBlob/CopyBlob(Blob2), two PutBlob/CopyBlob operations (Blob3) which results in the state at time T2 set forth in Table 2:

TABLE 2

State at time T2:
Blob1V1'
Blob2V2, Blob2V1-sd
Blob3V3, Blob3V1-sd, Blob3V2-sd

The following operations are then executed: PutBlob/CopyBlob(Blob1), DeleteBlob(Blob2), PutBlob/CopyBlob(Blob3), PutBlob/CopyBlob(Blob4) which results in the state at time T3 set forth in Table 3:

TABLE 3

State at time T3:
Blob1V2, Blob1V1'-sd
Blob2V2-sd, Blob2V1-sd
Blob3V4, Blob3V3-sd, Blob3V1-sd, Blob3V2-sd
Blob4V1

The following operations are then executed: DeleteBlob(Blob1), DeleteBlob(Blob3), PutBlob/CopyBlob(Blob4) which results in the state at time T4 set forth in Table 4:

TABLE 4

State at time T4:
Blob1V2-sd, Blob1V1'-sd
Blob2V2-sd, Blob2V1-sd,
Blob3V4-sd, Blob3V3-sd, Blob3V1-sd, Blob3V2-sd
Blob4V2, Blob4V1-sd In response to receiving a request to restore to time T2, the system 100 can the restore operation to be performed. These operations can be populated in the Restore Table as set forth in Table 5:

TABLE 5

| Name | Restore Operation | Source State | |
|------|-------------------|--------------|---|
| Blob1 | PromoteSnapshot | B1ob1V1'-sd | Pending |
| Blob2 | PromoteSnapshot | Blob2V2-sd | Pending |
| Blob3 | PromoteSnapshot | Blob3V3-sd | Pending |
| Blob4 | Delete | | Pending |

"PromoteSnapshot" refers to restoring a particular captured version of a blob. The restore component 140 can read through the Restore Table, iterating through each row to perform the restore operation (e.g., sequentially and/or in parallel).

Figure 2:
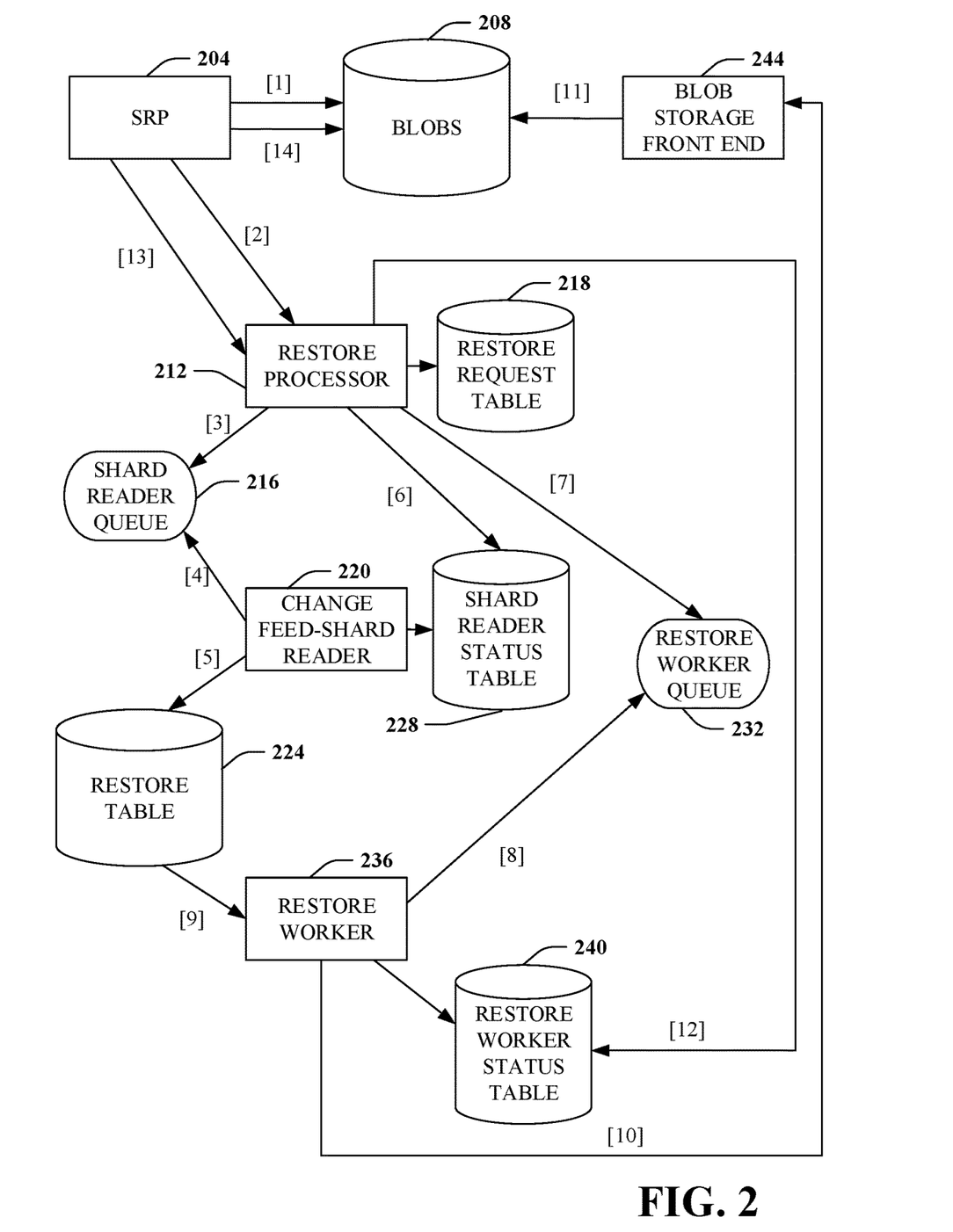
FIG. 2 is a functional block diagram that illustrates a system for point in time blob restore.

Turning to FIG. 2, a system for point in time blob restore 200 is illustrated. The system 200 includes a storage resource provider component 204 that manages a plurality of blobs 208.

The storage resource provider component 204 can receive a user request to restore particular blob(s) (e.g., blob range) to a particular point in time. In response to receiving the request, at [1], the storage resource provider component 204 can quarantine the particular blob(s) (e.g., block read and write operations to the particular blobs).

At [2], the storage resource provider component 204 can send a request to a restore processor 212. At [3], the restore processor 212 can read a change feed log and queue work for shard readers via a shard reader queue 216. The restore process 212 can store information regarding restore request(s) in a restore request table 218. At [4], a change feed-shard reader 220 retrieves work from the shard reader queue 216. At [5], the change feed-shard reader 220 populate a restore table 224.

At [6], the restore processor 212 checks a shard reader status table 228 for all change feed-shard readers 220 to complete work. When the restore processor 212 determines that all change feed-shard readers 220 have completed work, at [7], the restore processor 212 queues work in a restore worker queue 232.

At [8], one or more restore workers 236 retrieve work from the restore worker queue 232. At [9], the restore workers 236 read the restore table 224 to perform restore. Information regarding the restore workers 236 status can be stored in a restore worker status table 240. At [10], the restore operation is performed through blob storage front end 244.

At [11], the blob storage front end 244 updates the corresponding blob 208. At [12], the restore processor 212 checks the restore worker status table 240 for all restore workers 236 to complete. When the restore workers 236 have completed, at [13], in response to a query for restore status, the restore processor 212 can inform the storage resource provider component 204 that the requested restore operation has been completed. At [14], in response to being informed that the requested restore operation has been completed, the storage resource provider component 204 un-quarantine the particular blob(s) (e.g., unblock read and write operations to the particular blobs).

Thus, the restore processor 212 is responsible for monitoring and scheduling work for other workers. In some embodiments, the restore processor 212 can poll a queue for any new point in time restore request. For each request, the restore processor 212 can schedule a worker job that will process the request.

Each request enters with the SCHEDULE_PENDING status. For such request, the restore processor 212 can read the change log metadata to identify the shards associated with the account. For each of the shards, a row can be inserted into the Shard Reader Status Table 228 and a request is queued to the Shared Reader Queue 216 for the Shard Readers 220 to pick up. The status is updated to SHARD_READ_PENDING.

The restore processor 212 can periodically check the status of those table rows for completion. Any shard count changes will be checked, and new requests will be queued up (if changed) once all the previous shard processing is complete.

Once all the shard readers are complete, the status can be updated to RESTORE_WORK_PENDING. At this point all the associated rows in the Shard Reader Status Table 228 can be cleared. The restore processor 212 then inserts a row into the Restore Worker Status Table 240 and queues a request for the restore worker 236. The restore processor 212 can then periodically check the status of those rows in the Restore Worker Status Table 240 for completion of work. The state of the request in the Restore Table 224 gets updated appropriately.

The change feed-shard reader(s) 220 are stateless worker. Each change feed-shard reader 220 is associated with a single shard at any point time. The restore processor 212 provides the shard, timestamp and the blob ranges to work on. The change feed-shard reader 220 fetch, parse the change log and populate the Restore Table. Each change log is associated with a timestamp, previous version timestamp (in case of overwrite) and previous metadata in case of metadata update operations.

For each blob read from the change log, the previous version or the previous metadata are captured in the restore table 224. In some embodiments, capturing only the first instance of the blob is sufficient and any further updates to the blob can be ignored. If the change log contains any unsupported operation the restore is marked as failed. Blobs that needs to be restored are validated to make sure the blobs are still available so that there are no failures in the next phase.

For each blob, the change feed-shard reader(s) 220 can check if there is already a row in restore table 224 for that blob. If the row doesn't exist, a new row gets build from with the current change log. If the row exists, the update involves:

(1) Update the current version to max (current version from the row in restore table 224, current version from the change log);
(2) Update the previous version to min (previous version from the row in restore table 224, previous version from the change log) (e.g., needed if the change logs can be read out of order);
(3) Update the metadata if the previous version changed (set to NULL or the metadata associated with the previous version from the change log).

The restore workers 236 can then read through the restore table 224, iterating through each row to perform the restore operation. Restore workers 236 are stateless workers that drain the restore table 224. For each row, the restore operation is computed and calls into the blob storage front end 244. In some embodiments, there is exactly one operation that needs to be performed for a particular blob and this can be parallelized as there are no dependencies between any blobs.

Figure 3:
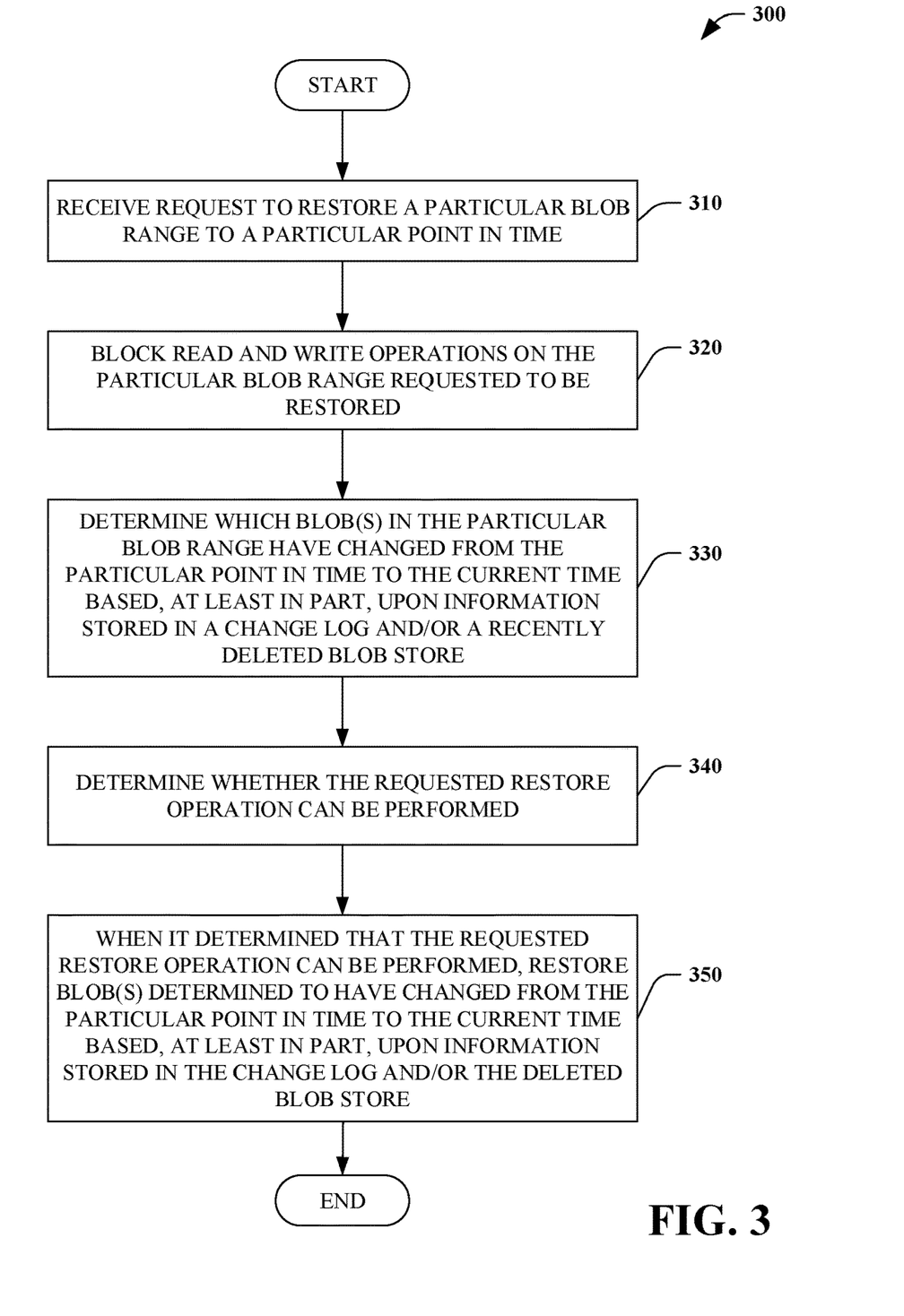
FIG. 3 is a flow chart that illustrates a method of point in time blob restoration.
Figure 4:
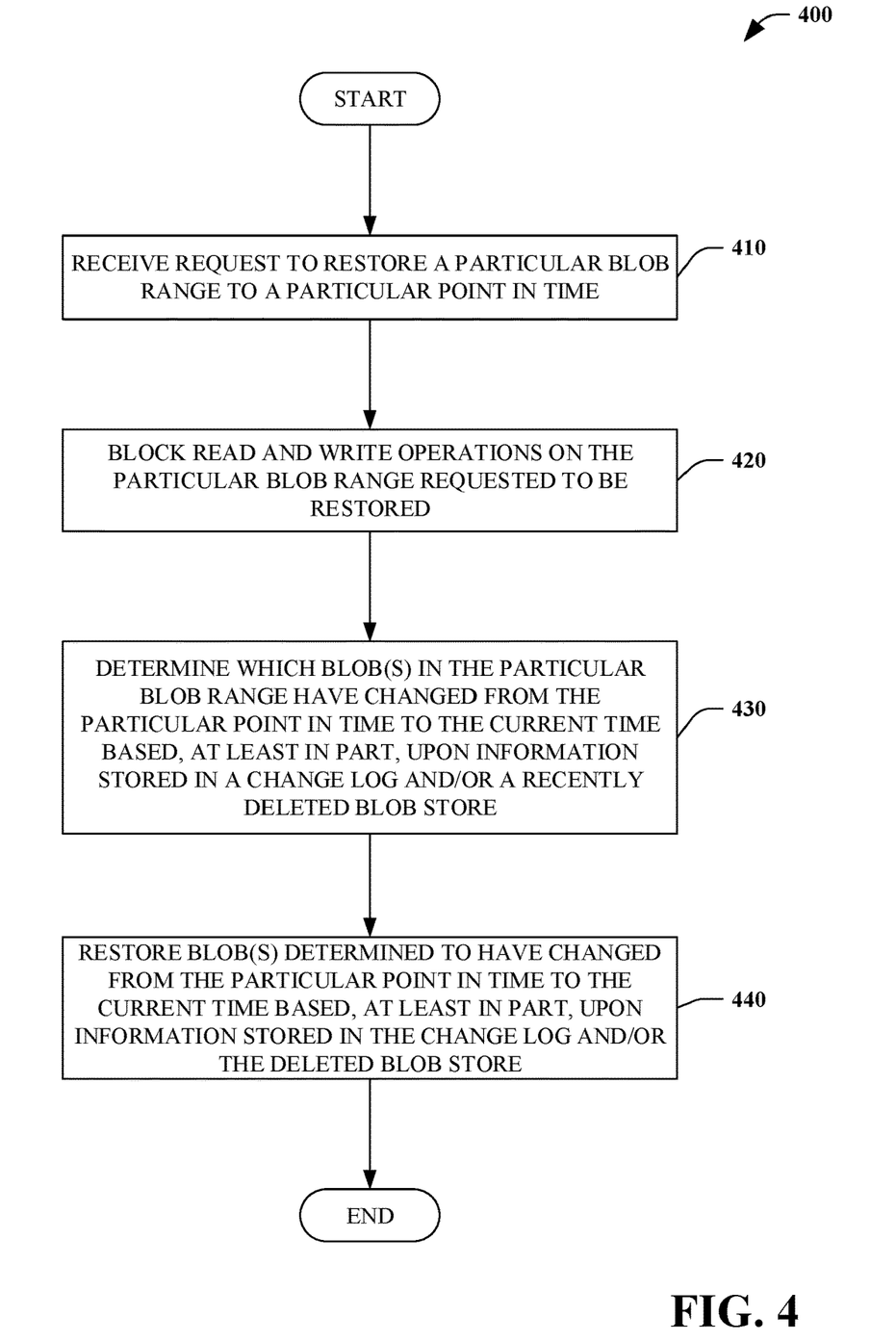
FIG. 4 is a flow chart that illustrates a method of point in time blob restoration.

FIGS. 3 and 4 illustrate exemplary methodologies relating to point in time blob restoration. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method of point in time blob restoration 300 is illustrated. In some embodiments, the method 300 is performed by the system 100 and/or the system 200.

At 310, a request to restore a particular blob range to a particular point in time is received. At 320, read and write operations on the particular blob range requested to be restored are blocked.

At 330, which blobs in the particular blob range have changed since the particular point in time are determined based, at least in part, upon information stored in a change log and/or a deleted blob store. At 340, it is determined whether the requested restore operation can be performed. At 350, when it is determined that the requested restore operation can be performed, at least one blob determined to have changed since the particular point in time is restored based, at least in part, upon information stored in the change log and/or the deleted blob store.

Referring to FIG. 4, a method of point in time blob restoration 400 is illustrated. In some embodiments, the method 400 is performed by the system 100 and/or the system 200.

At 410, a request to restore a particular blob range to a particular point in time is received. At 420, read and write operations on the particular blob range requested to be restored are blocked.

At 430, which blobs in the particular blob range have changed since the particular point in time are determined based, at least in part, upon information stored in a change log and/or a deleted blob store. At 440, at least one blob determined to have changed since the particular point in time is restored based, at least in part, upon information stored in the change log and/or the deleted blob store.

Described herein is a system for point in time blob restore, comprising: a computer comprising a processor and a memory having computer-executable instructions stored thereupon which, when executed by the processor, cause the computer to: receive a request to restore a particular blob range to a particular point in time; block read and write operations on the particular blob range requested to be restored; determine which blobs in the particular blob range have changed since the particular point in time based, at least in part, upon information stored in at least one of a change log or a deleted blob store; determine whether the requested restore operation can be performed; and when it is determined that the requested restore operation can be performed, restore at least one blob determined to have changed since the particular point in time based, at least in part, upon information stored in at least one of the change log or the deleted blob store.

The system can further include wherein the change log stores information about unstructured storage objects. The system can further include wherein the change log stores information regarding at least one of creation of a blob, modification of a blob, or, deletion of a blob. The system can further include wherein changes in the change log are stored as an event which identifies a location of a blob within cloud storage.

The system can further include wherein changes in the change log are stored as an event which identifies an account associated with the blob. The system can further include wherein changes in the change log are stored as an event which identifies at least one of a timestamp of the change, metadata of the change, or, a context of the change. The system can further include wherein the change log includes contextual attributes identifying at least one of a type of change, an account associated with a change, or, a user associated with a change.

Described herein is a method of point in time blob restoration, comprising: receiving a request to restore a particular blob range to a particular point in time; blocking read and write operations on the particular blob range requested to be restored; determining which blobs in the particular blob range have changed since the particular point in time based, at least in part, upon information stored in at least one of a change log or a deleted blob store; determining whether the requested restore operation can be performed; and when it is determined that the requested restore operation can be performed, restoring at least one blob determined to have changed since the particular point in time based, at least in part, upon information stored in at least one of the change log or the deleted blob store.

The method can further include wherein the change log stores information about unstructured storage objects. The method can further include wherein the change log stores information regarding at least one of creation of a blob, modification of a blob, or, deletion of a blob. The method can further include wherein changes in the change log are stored as an event which identifies a location of a blob within cloud storage.

The method can further include wherein changes in the change log are stored as an event which identifies an account associated with the blob. The method can further include wherein changes in the change log are stored as an event which identifies at least one of a timestamp of the change, metadata of the change, or, a context of the change. The method can further include wherein the change log includes contextual attributes identifying at least one of a type of change, an account associated with a change, or, a user associated with a change.

Described herein is a computer storage medium storing computer-readable instructions that when executed cause a computing device to: receive a request to restore a particular blob range to a particular point in time; block read and write operations on the particular blob range requested to be restored; determine which blobs in the particular blob range have changed since the particular point in time based, at least in part, upon information stored in at least one of a change log or a deleted blob store; determine whether the requested restore operation can be performed; and when it is determined that the requested restore operation can be performed, restore at least one blob determined to have changed since the particular point in time based, at least in part, upon information stored in at least one of the change log or the deleted blob store.

The computer storage medium can further include wherein the change log stores information about unstructured storage objects. The computer storage medium can further include wherein the change log stores information regarding at least one of creation of a blob, modification of a blob, or, deletion of a blob. The computer storage medium can further include wherein changes in the change log are stored as an event which identifies at least one of a location of a blob within cloud storage or an account associated with the blob.

The computer storage medium can further include wherein changes in the change log are stored as an event which identifies at least one of a timestamp of the change, metadata of the change, or, a context of the change. The computer storage medium can further include wherein the change log includes contextual attributes identifying at least one of a type of change, an account associated with a change, or, a user associated with a change.

Figure 5:
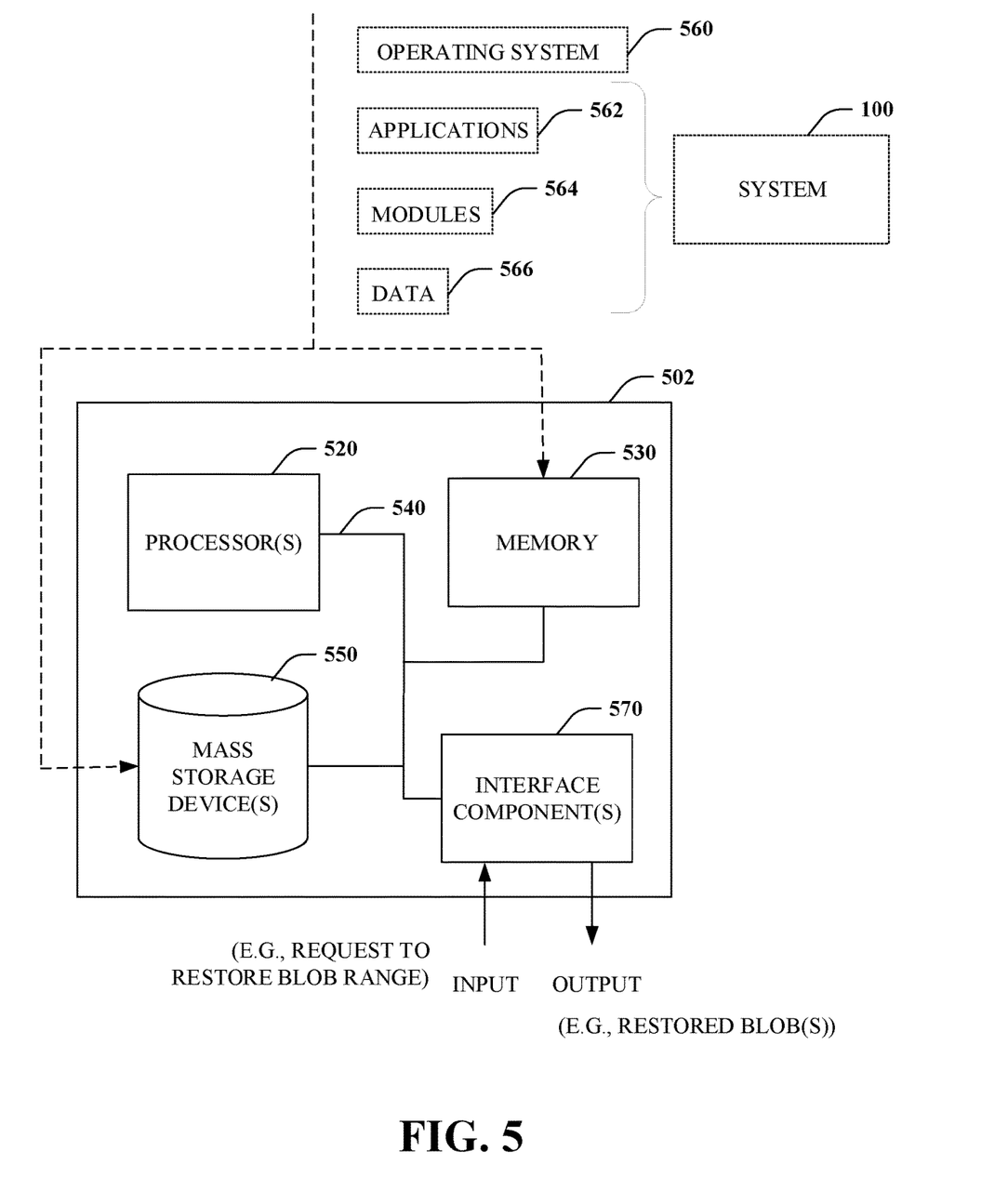
FIG. 5 is a functional block diagram that illustrates an exemplary computing system.

With reference to FIG. 5, illustrated is an example general-purpose computer or computing device 502 (e.g., mobile phone, desktop, laptop, tablet, watch, server, handheld, programmable consumer or industrial electronics, set-top box, game system, compute node, etc.). For instance, the computing device 502 may be used in a system for point in time blob restore 100 and/or a system for point in time blob restore 200.

The computer 502 includes one or more processor(s) 520, memory 530, system bus 540, mass storage device(s) 550, and one or more interface components 570. The system bus 540 communicatively couples at least the above system constituents. However, it is to be appreciated that in its simplest form the computer 502 can include one or more processors 520 coupled to memory 530 that execute various computer executable actions, instructions, and or components stored in memory 530. The instructions may be, for instance, instructions for implementing functionality described as being carried out by one or more components discussed above or instructions for implementing one or more of the methods described above.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 520 can be a graphics processor.

The computer 502 can include or otherwise interact with a variety of computer-readable media to facilitate control of the computer 502 to implement one or more aspects of the claimed subject matter. The computer-readable media can be any available media that can be accessed by the computer 502 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 502. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 530 and mass storage device(s) 550 are examples of computer-readable storage media. Depending on the exact configuration and type of computing device, memory 530 may be volatile (e.g., RAM), non-volatile (e.g., ROM, flash memory, etc.) or some combination of the two. By way of example, the basic input/output system (BIOS), including basic routines to transfer information between elements within the computer 502, such as during start-up, can be stored in nonvolatile memory, while volatile memory can act as external cache memory to facilitate processing by the processor(s) 520, among other things.

Mass storage device(s) 550 includes removable/non-removable, volatile/non-volatile computer storage media for storage of large amounts of data relative to the memory 530. For example, mass storage device(s) 550 includes, but is not limited to, one or more devices such as a magnetic or optical disk drive, floppy disk drive, flash memory, solid-state drive, or memory stick.

Memory 530 and mass storage device(s) 550 can include, or have stored therein, operating system 560, one or more applications 562, one or more program modules 564, and data 566. The operating system 560 acts to control and allocate resources of the computer 502. Applications 562 include one or both of system and application software and can exploit management of resources by the operating system 560 through program modules 564 and data 566 stored in memory 530 and/or mass storage device(s) 550 to perform one or more actions. Accordingly, applications 562 can turn a general-purpose computer 502 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 562, and include one or more modules 564 and data 566 stored in memory and/or mass storage device(s) 550 whose functionality can be realized when executed by one or more processor(s) 520.

In some embodiments, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 502 also includes one or more interface components 570 that are communicatively coupled to the system bus 540 and facilitate interaction with the computer 502. By way of example, the interface component 570 can be a port (e.g. serial, parallel, PCMCIA, USB, FireWire, etc.) or an interface card (e.g., sound, video, etc.) or the like. In one example implementation, the interface component 570 can be embodied as a user input/output interface to enable a user to enter commands and information into the computer 502, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 570 can be embodied as an output peripheral interface to supply output to displays (e.g., LCD, LED, plasma, etc.), speakers, printers, and/or other computers, among other things. Still further yet, the interface component 570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory having computer-executable instructions stored thereupon which, when executed by the at least one processor, cause the system to:
   receive a request to restore a particular blob range in blob storage to a particular point in time, the blob storage storing a plurality of blobs;
   block read and write operations on the particular blob range requested to be restored;
   determine one or more particular blobs in the particular blob range that have changed since the particular point in time based, at least in part, upon information stored in an append-only change log of chronological changes to the plurality of blobs in the blob storage;
   determine whether the requested restore operation can be performed; and
   when it is determined that the requested restore operation can be performed, restore the one or more particular blobs determined to have changed since the particular point in time based, at least in part, upon the information stored in the append-only change log of chronological changes to the plurality of blobs in the blob storage.

2. The system of claim 1, wherein the append-only change log stores certain information about changes to data of the one or more particular blobs and metadata of the one or more particular blobs.

3. The system of claim 1, wherein the append-only change log stores certain information regarding at least one of creation of the one or more particular blobs, modification of the one or more particular blobs, or deletion of the one or more particular blob.

4. The system of claim 1, wherein at least one change in the append-only change log is stored as an event which identifies a location of a specific blob within cloud storage.

5. The system of claim 1, wherein at least one change in the append-only change log is stored as an event which identifies an account associated with a specific blob.

6. The system of claim 1, wherein at least one change in the append-only change log is stored as an event which identifies at least one of a timestamp of the at least one change, metadata of the at least one change, or a context of the at least one change.

7. The system of claim 1, wherein the append-only change log includes contextual attributes identifying at least one of a type of a particular change to the one or more particular blobs, an account associated with the particular change, or a user associated with the particular change.

8. A method, comprising:
   receiving a request to restore a particular blob range in blob storage to a particular point in time, the blob storage storing a plurality of blobs;
   blocking read and write operations on the particular blob range requested to be restored;
   determining one or more particular blobs in the particular blob range that have changed since the particular point in time based, at least in part, upon information stored in an append-only change log of chronological changes to the plurality of blobs in the blob storage;
   determining whether the requested restore operation can be performed; and
   when it is determined that the requested restore operation can be performed, restoring the one or more particular blobs determined to have changed since the particular point in time based, at least in part, upon the information stored in the append-only change log of chronological changes to the plurality of blobs in the blob storage.

9. The method of claim 8, wherein the append-only change log stores certain information about changes to data of the one or more particular blobs and metadata of the one or more particular blobs.

10. The method of claim 8, wherein the append-only change log stores certain information regarding at least one of creation of the one or more particular blobs, modification of the one or more particular blobs, or deletion of the one or more particular blobs.

11. The method of claim 8, wherein at least one change in the append-only change log is stored as an event which identifies a location of a specific blob within cloud storage.

12. The method of claim 8, wherein at least one change in the append-only change log is stored as an event which identifies an account associated with a specific blob.

13. The method of claim 8, wherein at least one change in the append-only change log is stored as an event which identifies at least one of a timestamp of the at least one change, metadata of the at least one change, or a context of the at least one change.

14. The method of claim 8, wherein the append-only change log includes contextual attributes identifying at least one of a type of a particular change to the one or more particular blobs, an account associated with the particular change, or a user associated with the particular change.

15. A computer storage medium storing computer-readable instructions that, when executed, cause a computing device to:
   receive a request to restore a particular blob range in blob storage to a particular point in time, the blob storage storing a plurality of blobs;
   block read and write operations on the particular blob range requested to be restored;
   determine one or more particular blobs in the particular blob range that have changed since the particular point in time based, at least in part, upon information stored in at an append-only change log of chronological changes to the plurality of blobs in the blob storage;
   determine whether the requested restore operation can be performed; and
   when it is determined that the requested restore operation can be performed, restore the one or more particular blobs determined to have changed since the particular point in time based, at least in part, upon the information stored in the append-only change log of chronological changes to the plurality of blobs in the blob storage.

16. The computer storage medium of claim 15, wherein the append-only change log stores certain information about changes to data of the one or more particular blobs and metadata of the one or more particular blobs.

17. The computer storage medium of claim 15, wherein the append-only change log stores certain information regarding creation of the one or more particular blobs.

18. The computer storage medium of claim 15, wherein changes in the append-only change log identify at least one of a location of a specific blob within cloud storage or an account associated with the specific blob.

19. The computer storage medium of claim 15, wherein the append-only change log includes timestamps of the chronological changes to the plurality of blobs.

20. The computer storage medium of claim 15, wherein the append-only change log includes contextual attributes identifying accounts associated with individual chronological changes.

* * * * *